United States Patent [19]

Clemente et al.

[11] 4,389,702
[45] Jun. 21, 1983

[54] SWITCHING POWER SUPPLY CIRCUIT HAVING CONSTANT OUTPUT FOR A WIDE RANGE OF INPUT VOLTAGE

[75] Inventors: Stefano Clemente, Rancho Palos Verdes; Brian R. Pelly, Palos Verdes Estates; Rutton Ruttonsha, Torrance, all of Calif.

[73] Assignee: International Rectifier Corporation, Los Angeles, Calif.

[21] Appl. No.: 412,103

[22] Filed: Aug. 27, 1982

Related U.S. Application Data

[63] Continuation of Ser. No. 179,695, Aug. 20, 1980, abandoned.

[51] Int. Cl.³ .................................. H02M 3/335
[52] U.S. Cl. .................................. 363/21; 363/56; 363/97; 363/142
[58] Field of Search .................... 363/18–21, 363/55–56, 97, 131, 142, 143; 307/540, 545, 551, 554, 561, 566

[56] References Cited

U.S. PATENT DOCUMENTS

| | | | |
|---|---|---|---|
| 3,621,363 | 11/1971 | Ginnman et al. | 363/20 |
| 3,697,852 | 10/1972 | Gerbitz | 363/21 |
| 3,963,973 | 6/1976 | Vermolen | 363/20 |
| 4,004,209 | 1/1977 | Lawson, Jr. | 363/37 |
| 4,016,482 | 4/1977 | Cielo et al. | 363/56 X |
| 4,187,536 | 2/1980 | Govaert et al. | 363/21 |

Primary Examiner—William M. Shoop
Assistant Examiner—Peter S. Wong
Attorney, Agent, or Firm—Ostrolenk, Faber, Gerb & Soffen

[57] ABSTRACT

A switching power supply is disclosed using a single transistor circuit which provides a constant output voltage for a range of input voltages extending from a nominal 115 volt power supply to a nominal 220/240 volt power supply without requiring a change in the circuit configuration throughout the range of input voltages. The circuit is disclosed in connection with a single transistor forward converter circuit, in which the transformer winding of the converter circuit is provided with a uni-directional clamp to prevent the transformer voltage of a given polarity from exceeding the clamping voltage magnitude. By clamping one polarity of the transformer voltage which is in series with the switching transistor, the maximum peak-to-peak voltage on the transistor is reduced from that which would be produced in the absence of clamping and enables the use of a power MOSFET transistor for the circuit. The clamping circuit is disclosed as a zener clamp and as a circuit including a parallel resistor and capacitor and series diode.

4 Claims, 21 Drawing Figures

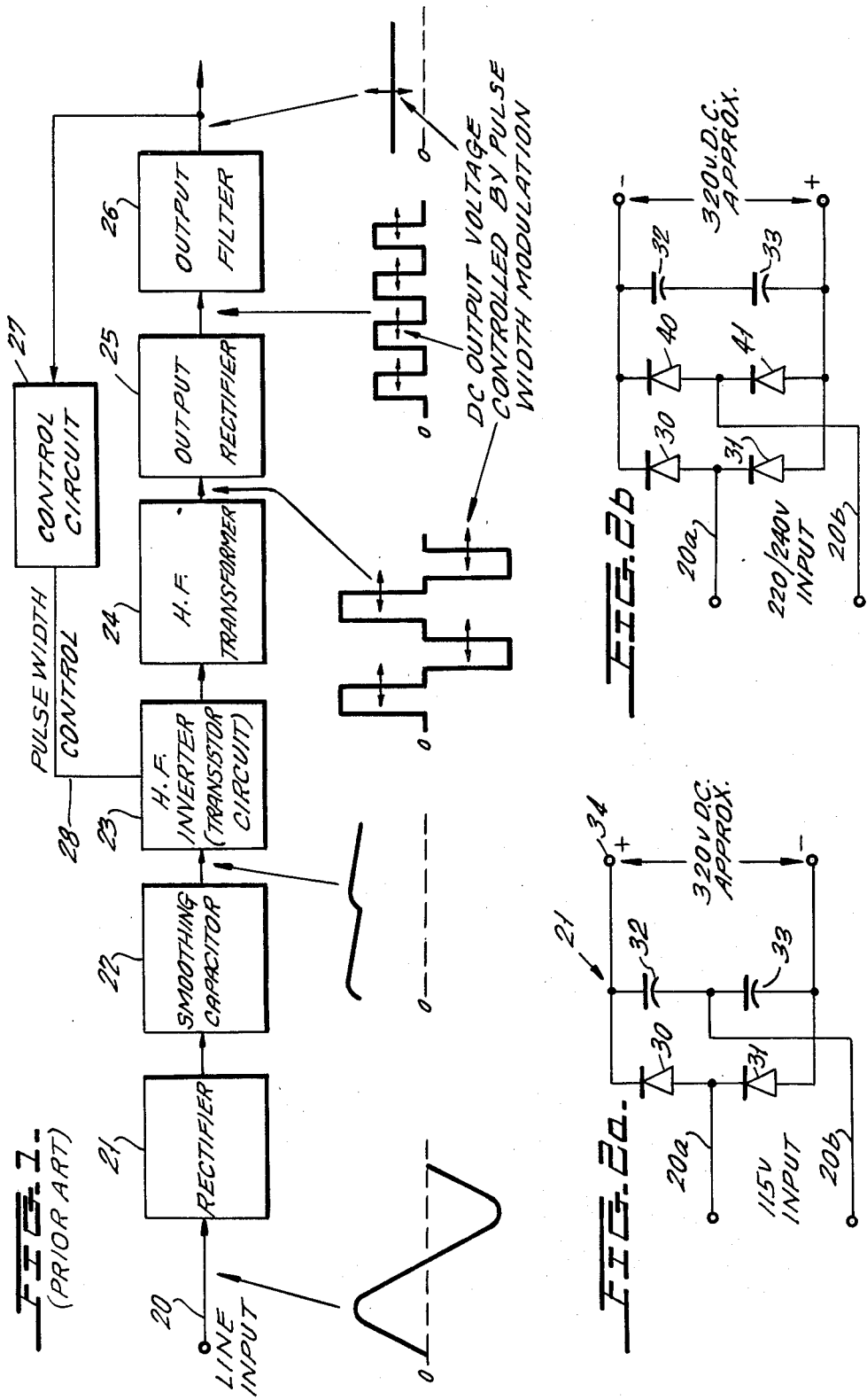

FIG. 3.
(PRIOR ART)
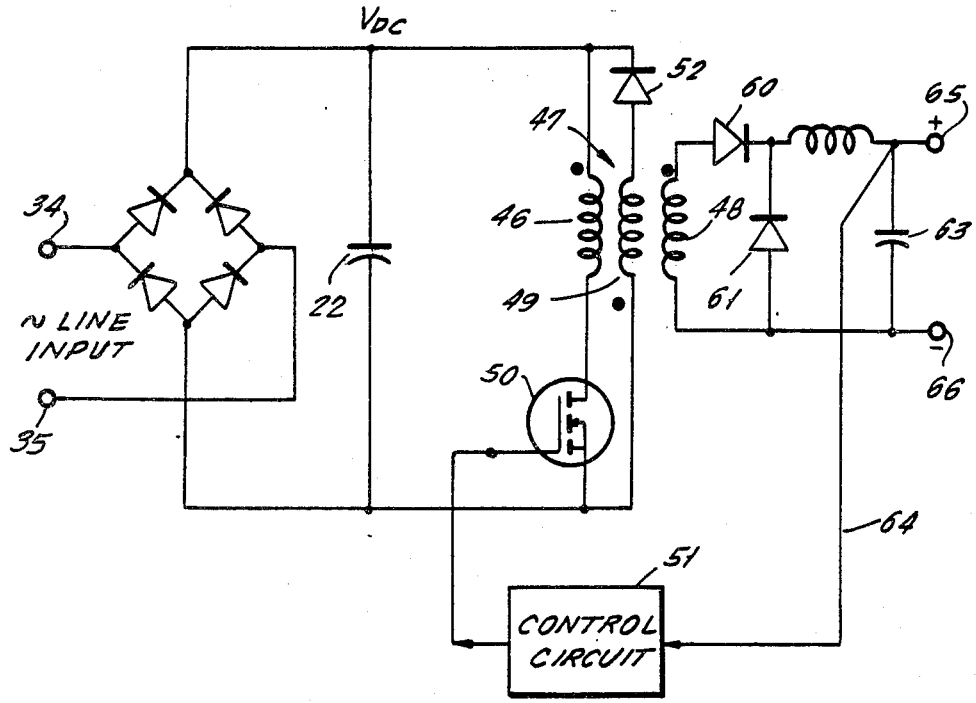
FIG. 4a. VOLTAGE ACROSS SWITCHING TRANSISTOR
FIG. 4b. CURRENT IN SWITCHING TRANSISTOR
FIG. 4c. CURRENT IN CLAMPING WINDING
FIG. 4d. CURRENT IN TRANSFORMER SECONDARY
FIG. 4e. DC OUTPUT VOLTAGE

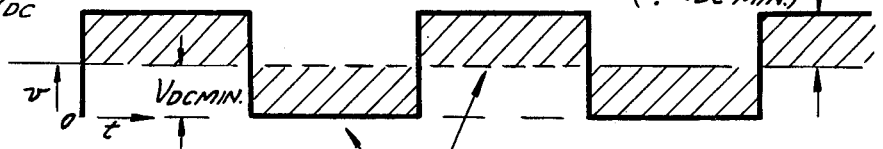
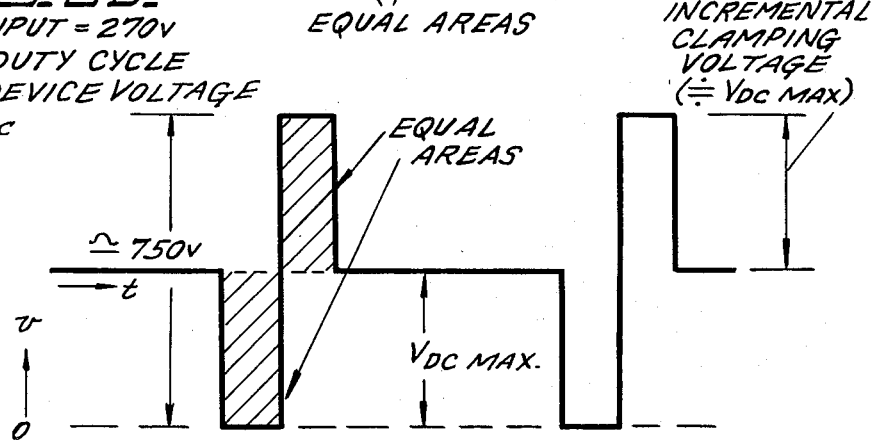
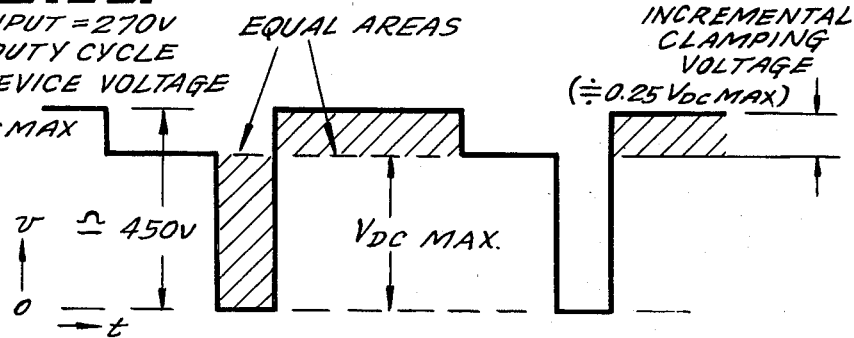

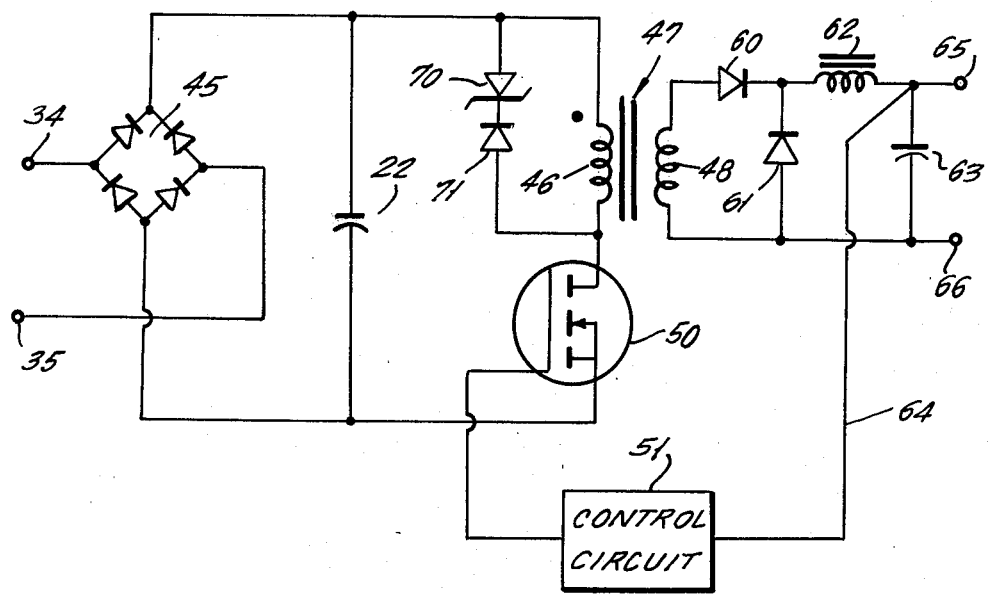
_FIG. 6a._
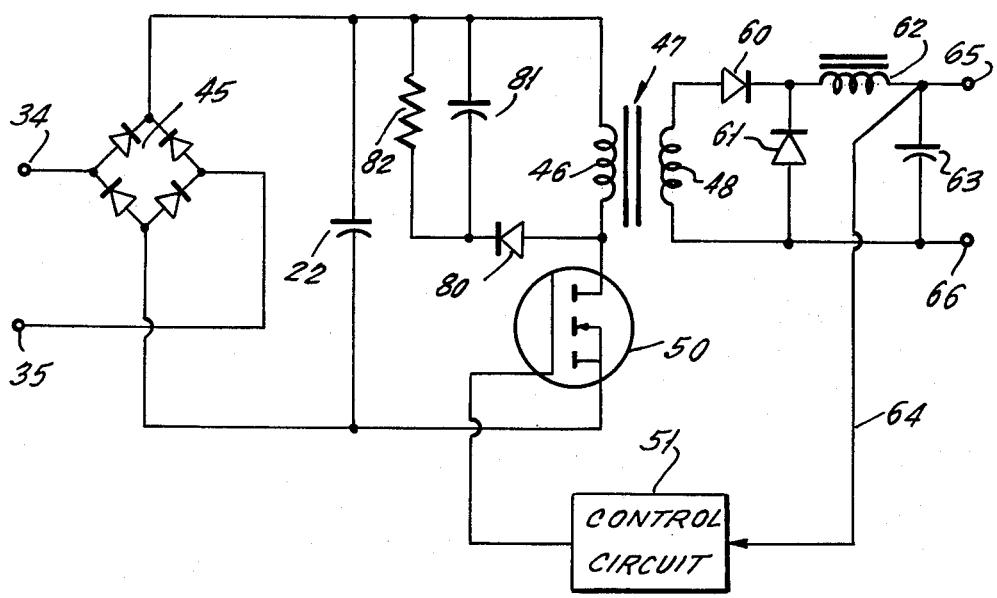
_FIG. 6b._

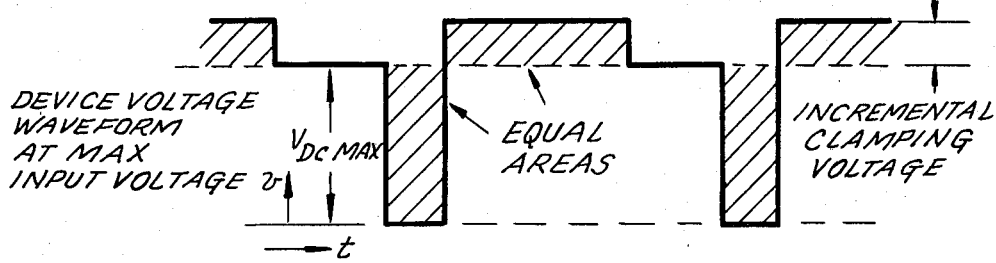

FIG. 7a

DEVICE VOLTAGE WAVEFORM AT MAX INPUT VOLTAGE $V_{DC\,MAX}$ — EQUAL AREAS — INCREMENTAL CLAMPING VOLTAGE

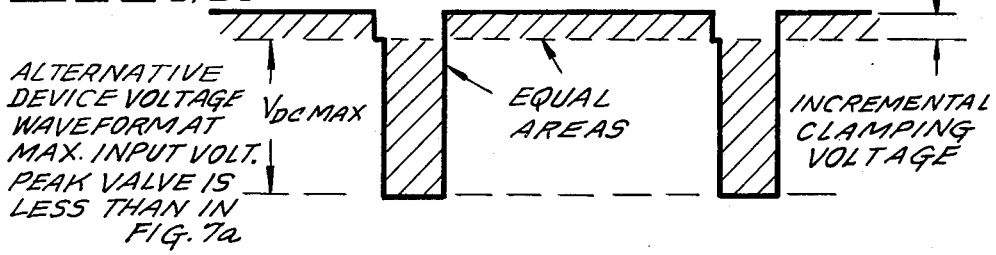

FIG. 7b

ALTERNATIVE DEVICE VOLTAGE WAVEFORM AT MAX. INPUT VOLT. PEAK VALVE IS LESS THAN IN FIG. 7a — $V_{DC\,MAX}$ — EQUAL AREAS — INCREMENTAL CLAMPING VOLTAGE

FIG. 7c

TRANSFORMER MAGNETIZING CURRENT FOR FIG. 7b

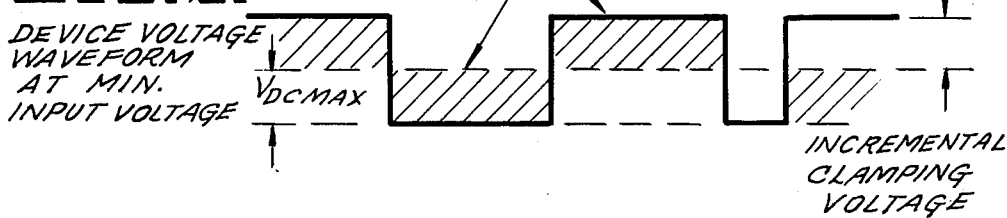

FIG. 7d

DEVICE VOLTAGE WAVEFORM AT MIN. INPUT VOLTAGE — $V_{DC\,MAX}$ — EQUAL AREAS — INCREMENTAL CLAMPING VOLTAGE

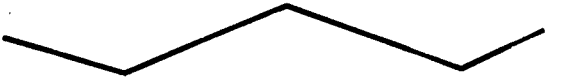

FIG. 7e

TRANSFORMER MAGNETIZING CURRENT FOR FIG. 7d

FIG. 9.

| AC INPUT VOLTAGE at Terminals 34 and 35 | DC SOURCE VOLTAGE at Rectifier 45 | DC SOURCE CURRENT (Amperes) | DC POWER INPUT (Watts) | DC OUTPUT VOLTAGE at Terminals 64 and 65 | DC OUTPUT CURRENT (Amperes) | DC POWER OUTPUT (Watts) | CALCULATED EFFICIENCY (%) |
|---|---|---|---|---|---|---|---|
| 85 | 110 | 1.290 | 141.90 | 5.03 | 20.20 | 101.60 | 71.60 |
|  | 120 | 0.553 | 66.36 | 5.03 | 10.15 | 51.05 | 76.94 |
|  | 125 | 0.265 | 33.13 | 5.03 | 5.00 | 25.15 | 75.92 |
| 150 | 200 | 0.649 | 129.80 | 5.03 | 20.00 | 100.60 | 77.50 |
|  | 210 | 0.300 | 63.00 | 5.03 | 10.10 | 50.80 | 80.64 |
|  | 212 | 0.155 | 32.86 | 5.03 | 5.20 | 26.16 | 79.60 |
| 265 | 360 | 0.354 | 127.44 | 5.03 | 20.10 | 101.10 | 79.33 |
|  | 370 | 0.175 | 64.75 | 5.03 | 10.45 | 52.56 | 81.18 |
|  | 375 | 0.093 | 34.88 | 5.03 | 5.30 | 26.66 | 76.44 |

MEASURED EFFICIENCY OF CIRCUIT SHOWN IN FIGURE 8 UNDER VARIOUS OPERATING CONDITIONS. SWITCHING FREQUENCY = 100kHz

SWITCHING POWER SUPPLY CIRCUIT HAVING CONSTANT OUTPUT FOR A WIDE RANGE OF INPUT VOLTAGE

This is a continuation of pending application Ser. No. 179,695, filed Aug. 20, 1980, now abandoned.

BACKGROUND OF THE INVENTION

This invention relates to switching power supplies, and more specifically relates to a novel switching power supply having a constant output voltage produced from a wide range of input a-c voltages using a single MOSFET transistor for the switching circuit.

Voltage regulators are well known for producing a constant output voltage, usually d-c, from a source of unregulated input a-c voltage. One form of regulated power supply is a switching power supply circuit which contains a rectifier for rectifying the input line voltage of the power supply; an inverter circuit for producing a relatively high frequency output voltage from the rectified line input; and a pulse width modulator for varying the pulse width of the output of the high frequency inverter. The pulse width modulated high frequency output is then rectified and applied through suitable filters to produce a controlled output voltage. A suitable feedback circuit is provided between the output circuit and the pulse width modulating circuit to vary the pulse width as necessary to maintain a given output voltage.

The switching power supply circuit described above can be used as a universal power supply for operation from a-c power line voltages which are, for example, nominally 115 volts in the United States, and 220 volts or 240 volts in Europe. However, input circuit modifications must be made when the circuit is converted either to a 115 volt system or a 220/240 volt system to produce a given regulated output circuit.

The requirement for switching the input circuit configuration when the power supply circuit is operated at one end or the opposite end of its input voltage range increases the complexity of the circuit and increases its cost.

The present invention provides a novel circuit configuration for a switching power supply which has a sufficiently wide regulation range as to enable the production of a given output voltage, whether the input voltage is a nominal 115 volts power line input or a nominal 240 volts power line input without input circuit switching. The invention further permits the use of a single MOSFET transistor as the transistor switch for the switching power supply.

BRIEF DESCRIPTION OF THE INVENTION

In accordance with the present invention, a novel clamping circuit is provided for the transformer in series with a MOSFET power switching transistor which limits the peak-to-peak voltage applied across the transistor by clamping only one polarity of the voltage relative to ground. The total voltage-time integral of the voltage appearing across the transformer is equal for positive and negative polarities, but the peak voltage of the clamped voltage is maintained at or below the clamping value. Consequently, the peak voltage across the transistor is held sufficiently low as to enable the use of commercially available power MOSFET devices which are rated at a reverse peak voltage of 500 volts, thereby to enable the transistor to operate in a single transistor switching power supply circuit with an input voltage of 240 volts nominal without damage to the transistor. Consequently, the novel invention permits the production of a switching power supply employing a single transistor which is uniquely capable of operating from a nominal a-c line voltage of either 115 volts or 220/240 volts, thereby covering the major segment of the worldwide requirement for a switching power supply to be driven from the main power line voltage of a particular locality. More generally, however, the invention provides a novel switching power supply having exceptional voltage range without requiring switching from one input voltage setting to another when going from one end to the other end of the range.

BRIEF DESCRIPTION OF THE DRAWINGS

FIG. 1 is a block diagram of a generalized switching power supply circuit well known in the prior art.

FIG. 2a is a circuit diagram of a voltage doubler which could be used in the switching power supply of FIG. 1 in a locality where the input voltage to the power supply is nominally 115 volts.

FIG. 2b is a circuit diagram of the input circuit configuration of the switching power supply of FIG. 1 when the input voltage to the device is nominally 220/240 volts.

FIG. 3 is a circuit diagram of a prior art type of single transistor forward converter circuit which would be driven from the circuits of FIG. 2a or 2b.

FIG. 4a shows the voltage across the switching transistor of FIG. 3 as a function of time.

FIG. 4b shows the current in the switching transistor of FIG. 3 as a function of time.

FIG. 4c shows the current in the clamping winding in the circuit of FIG. 3 as a function of time.

FIG. 4d shows the current in the transformer secondary winding in FIG. 3 as a function of time.

FIG. 4e shows the d-c output voltage of the circuit of FIG. 3 as a function of time.

FIG. 5a shows the transformer voltage of FIG. 3 when the line input is at a minimum voltage to which a switching power supply is designed to handle.

FIG. 5b shows the voltage on the transformer of FIG. 3 when the input line voltage is at the highest value for which the circuit is designed.

FIG. 5c shows the voltage waveform across the transformer winding of FIG. 3 when using a clamping circuit in accordance with the invention, thus illustrating the manner in which the novel invention reduces the peak-to-peak voltage across the switching transistor by clamping the maximum potential which one polarity of the transformer voltage can reach.

FIG. 6a illustrates a first embodiment of the invention employing a zener diode clamping circuit on the transformer primary winding in a circuit similar to that of FIG. 3.

FIG. 6b is a second embodiment of the invention wherein a resistor-capacitor clamping circuit is applied to the transformer winding in the circuit of FIG. 3.

FIG. 7a is similar to FIG. 5c and shows the voltage waveform across the transformer winding of FIGS. 6a and 6b at maximum rated input voltage.

FIG. 7b shows an alternate transistor device waveform for the device voltage in which the peak value of the voltage is less than that shown in FIG. 7a.

FIG. 7c shows the transformer magnetizing current for the case of FIG. 7b.

FIG. 7d shows the transistor device voltage waveform for minimum input voltage.

FIG. 7e shows the magnetizing current of the transformer for the case of FIG. 7d.

FIG. 9 is a chart showing experimental values measured with the circuit of FIG. 8.

DETAILED DESCRIPTION OF THE INVENTION

Figure 8:
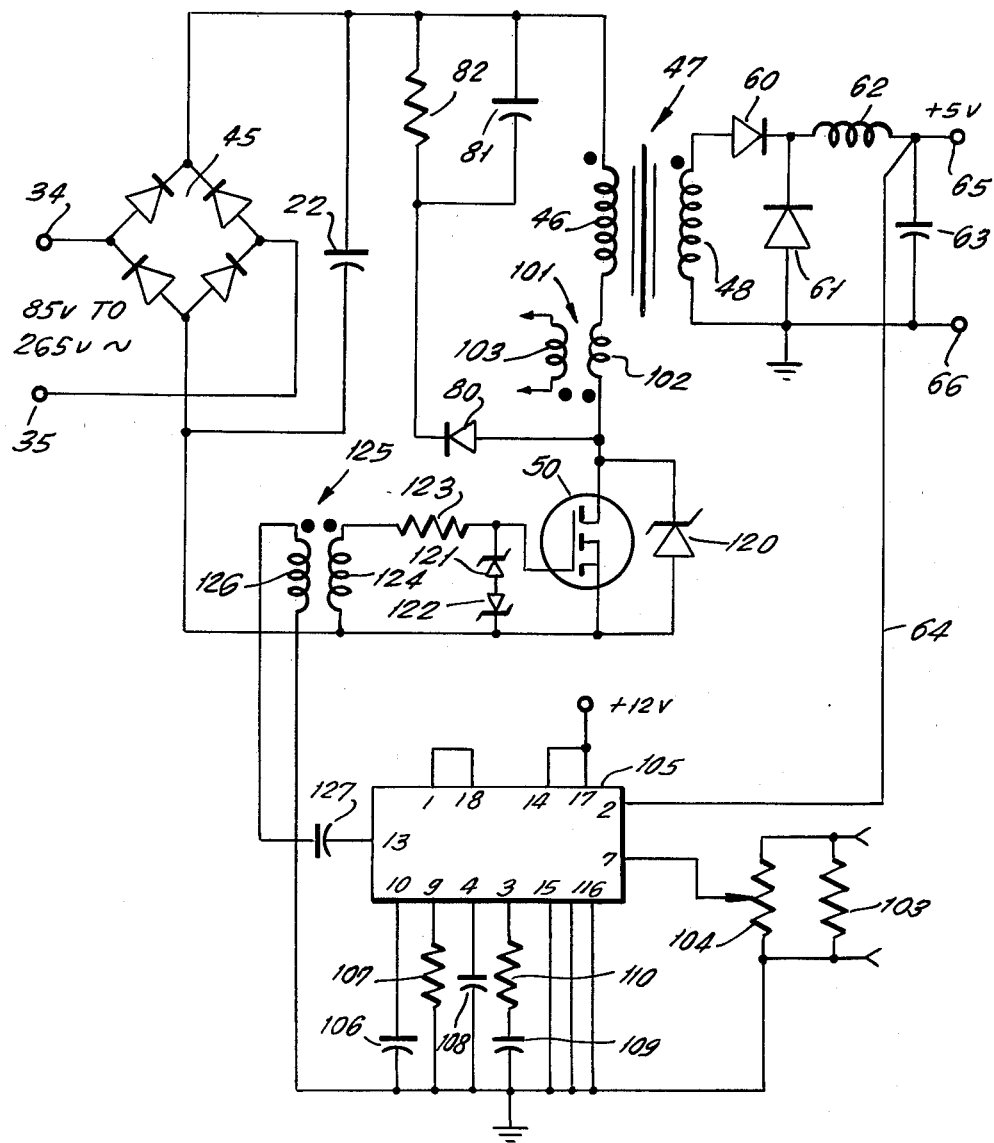
FIG. 8 is a detailed circuit diagram of a preferred embodiment of the present invention.

FIG. 1 shows a typical prior art type basic switching power supply in block diagram form. Typical wave shapes are also applied to the block diagram.

An a-c power line input 20 is connected to a suitable a-c line which could, for example, be a 60 hertz power line. The a-c power line 20 is connected to rectifier means 21 and a conventional smoothing capacitor 22. The rectified output on smoothing capacitor 22 is then applied to a relatively high frequency transistorized inverter circuit 23 which inverts the d-c voltage appearing at smoothing capacitor 22 to a relatively high a-c frequency, typically 20 kilohertz to 100 kilohertz.

The high frequency output of inverter 23 is then applied to a high frequency transformer 24 and then to an output rectifier 25 which has its output connected to a suitable filter 26 to produce a relatively smooth d-c output voltage. The output voltage of filter 26 is suitably sampled by a conventional control circuit 27 and compared to a suitable reference (not shown) to produce an output signal on line 28 which adjusts the pulse width output of high frequency inverter 23 (shown by the arrows in the waveforms shown with FIG. 1) to regulate the output voltage to maintain it at some constant output value regardless of changes in the input voltage at line input 20.

It is a common design goal to achieve a switching power supply unit such as that of FIG. 1 that is capable of operation from nominal a-c line voltages of both 115 V and 220/240 V, and thus to cover a major segment of the worldwide market requirement with a single basic unit. Conventionally, this is accomplished by changing the configuration of input rectifier circuit 21 to provide essentially the same d-c source voltage for the high frequency inverter 23, with 115 or 220/240 volt input.

A voltage doubler arrangement, such as that shown in FIG. 2a, may be used when operating from a 115 V input, and the full rectifier bridge arrangement, shown in FIG. 2b, may be used when operating from 220/240 V input.

In FIG. 2a, a 115 volt, 60 hz. input is connected to lines 20a and 20b (corresponding to line 20 in FIG. 1). The voltage doubler consists of diodes 30 and 31 and capacitors 32 and 33. The output at terminals 34 and 35 will be approximately 320 volts d-c.

In FIG. 2b, the 220/240 V a-c, 50 hz. to 60 hz. input is applied to the bridge connected rectifier consisting of diodes 30, 31, 40 and 41. The other components are the same as those of FIG. 2a. The output voltage at terminals 34 and 35, which is connected to inverter 23 in FIG. 1 is, again, about 320 volts d-c. Switching devices, not shown, are of course required to properly connect line 20b and diodes 40 and 41 when switching between the inputs of FIGS. 2a and 2b.

While the object of the invention is to provide a switching voltage regulator which produces a fixed output over a very wide range of input voltages, a principal goal of the invention is to eliminate the need for switching from one input voltage setting to another when switching between nominal input a-c voltages of 115 volts and 220/240 volts.

The novel invention is later described in connection with the single transistor "forward converter" circuit shown in FIG. 3. The input to the circuit of FIG. 3 includes terminals 34 and 35 of FIGS. 2a and 2b which in the prior art are appropriately switched, depending on the input a-c voltage to the switching regulator. Terminals 34 and 35 are connected to bridge connected rectifier 45 which is equivalent to rectifier 21 of FIG. 1. The d-c terminals of rectifier 45 are connected across smoothing capacitor 22.

Capacitor 22 is connected to primary winding 46 of transformer 47. Transformer 47 also has a secondary winding 48 and a tertiary winding 49 which acts as a clamping winding as will be described.

Primary winding 46 is connected in series with the drain and source electrodes of power MOSFET switching transistor 50 and with the rectifier 45. A suitable control circuit 51 is connected to the gate of transistor 50. Clamping winding 49, which has the same number of turns as primary winding 46, is connected in series with diode 52, and winding 49 and diode 52 are connected in parallel with winding 46 and transistor 50. Note that transistor 50 and control circuit 51 perform the general function of inverter 23 of FIG. 1 while transformer 47 generally corresponds to transformer 24 of FIG. 1.

Secondary winding 48 in FIG. 3 is connected in series with diodes 60 and 61, corresponding to rectifier 25 of FIG. 1. The diode 60 is then connected in series with choke 62 and capacitor 63 which correspond to the filter 26 of FIG. 1.

A control circuit lead 64 from regulated output d-c voltage terminals 65 and 66 is connected to control circuit 51 which controls the pulse width current produced by switching transistor 50 in a manner to maintain a given output voltage at terminals 65 and 66.

Theoretical voltage and current waveforms which describe the operation of the circuit of FIG. 3 are shown in FIGS. 4a through 4e. Thus, during the conduction period of transistor 50, current is transferred from the primary d-c power source rectifier 45 through the output transformer 47 to the output rectifier circuit 60-61. During the OFF period of the transistor 50, the magnetizing current in the transformer 47 is returned via the clamping winding 49 to the primary d-c source 45, resetting the flux in the transformer 47, prior to the next cycle of operation.

The clamping winding 49 normally has the same number of turns as the primary 48, which means that the peak "clamping" voltage developed across transistor 50 during the OFF period is twice the primary d-c supply voltage. Thus, the maximum permissible conduction period of the transistor 50 is 50% of the total cycle time. The conduction period cannot be longer than this, because the transformer flux would not completely reset during the transistor 50 OFF period, and the transformer 47 would be driven into saturation.

The circuit of FIG. 3 is designed so that a 50% duty cycle is approached for the condition of low input voltage and full load current. The duty cycle decreases below this value as the line input voltage increases and the output load current decreases, under the action of closed-loop regulator circuit 51 which automatically adjusts the conduction time of the transistor 50 to keep an essentially constant output voltage at terminals 65 and 66. FIGS. 4a to 4e show an intermediate regulation condition. This closed-loop regulator circuit 51 responds to the "error" difference between a preset reference voltage (not shown) and the actual d-c output voltage of the power supply between terminals 65 and 66 in such a way as to adjust the conduction time of the switching transistor to reduce the error. Circuitry for implementation of this basic principle is well known.

It is possible, in principle, to design the conventional circuit of FIG. 3 so that a 50% nominal conduction duty cycle is obtained for a line input voltage of say 90 V (representing a "low" 115 V nominal situation). This low theoretical operating waveform voltage, which appears across winding 46, is shown in FIG. 5a. At a line input voltage of 270 V (representing a "high" 240 V nominal situation), the conduction duty cycle can be shown to become 1 in 6, and the corresponding peak voltage developed across the winding 46 and thus transistor 50 would be approximately 750 V, as shown by the waveform in FIG. 5b.

Practical implementation of the approach described above would be difficult, if not impractical, because of limitations on presently available switching transistor devices.

Thus, the required voltage rating of the switching device would be at least 800 V. Although this voltage rating is obtainable with available bipolar transistors, the relatively high peak current required for this mode of operation would not favor a bipolar device. The reason for this is as follows: The circuit of FIG. 3 is designed for operation over an input voltage range of 90 V to 270 V and would be required to operate at a minimum duty cycle of about 1 in 6. If the regulator provides a 100 watt output, the peak transistor current would be about 2.2 amperes. By contrast, this same circuit when designed for the much more modest a-c input voltage range of 200 V to 270 V (representing "low" and "high" conditions about a nominal 240 V input) would, however, operate with an increased minimum duty cycle, of about 0.38, and the peak transistor current for a 100 watt output would be reduced to approximately 1 ampere.

The bipolar transistor is limited in its peak current handling capability because its gain decreases as current increases. A bipolar transistor of more than twice the current carrying capability (and hence a larger, more costly device) would be required to cover the extended range of input voltage (90 V to 270 V, versus 200 V to 270 V) and the implementing of the circuit of FIG. 3 with a bipolar device would entail a great economic penalty.

The power MOSFET transistor, on the other hand, is not limited in its ability to handle high peak current in the same way as a bipolar device, because its gain does not decrease with increasing current. This type of device is therefore much better suited to the circuit approach of FIG. 3, with regard to current carrying considerations. However, MOSFET transistors are not now available with the 800 V rating that would be needed for the circuit of FIG. 3 when operated from a nominal 240 V input.

The present invention provides a circuit which drastically reduces the required device voltage rating to permit use of a power MOSFET in a circuit of the type of FIG. 3 having a very wide range of input voltage.

In accordance with the invention, it is recognized that there is no need to clamp the peak transistor voltage to twice the supply voltage as in FIG. 3, not for that matter, to clamp the supply voltage to a level that is even related to the d-c supply voltage. Thus, the transistor voltage can be clamped so any level that is higher than the d-c supply voltage, so long as the voltage-time integral developed across the transformer 47 during the clamping period is equal to the voltage-time integral during the conduction period. Thus, the waveform shown in FIG. 5c would permit the transformer 47 to operate in an a-c mode without saturation, but the peak device voltage is reduced from about 750 V to around 450 V, for a 240 V input. This peak device voltage is within the capability of presently available MOSFETS, for example, the type IRF820 HEXFET which is a power MOSFET available from International Rectifier Corporation of El Segundo, Calif.

The waveform of FIG. 5a for low input voltage and of FIG. 5c for a high input voltage can be accomplished by numerous circuits.

A first embodiment of the invention is shown in FIG. 6a wherein the circuit of FIG. 3 is modified to incorporate a zener diode clamp on the primary winding 46 of transformer 47. Components similar to those of FIG. 3 are given similar numerals in FIG. 6a. Note that the clamping winding 49 of FIG. 3 is eliminated.

The zener clamp in FIG. 6a consists of zener diode 70 and diode 71 connected across winding 46. In the arrangement of FIG. 6a, zener diode 70 will hold the voltage in the forward polarity (arbitrarily chosen) to the incremental clamping voltage shown which will be constant regardless of the d-c voltage level and will permit resetting of the flux of the core of transformer 47 over a relatively long interval. However, the voltage time area applied to the transformer during conduction of switch 50 is identical to that applied when the switch 50 is OFF. The operation of the circuit of FIG. 6a is otherwise generally similar to that of FIG. 3.

Another embodiment of the invention is shown in FIG. 6b. The circuit of FIG. 6b is like that of FIGS. 3 and 6a except that the novel clamping circuit across winding 46 consists of diode 80, capacitor 81 and resistor 82. Capacitor 81 acts as a reservoir capacitor which charges to an essentially smooth voltage in normal, steady-state operation. Resistor 82 determines the level to which capacitor 81 will charge. Components 80, 81 and 82 then define a clamping circuit which absorbs the energy stored in the magnetizing inductance of transformer 47, and in the leakage inductance when the power MOSFET 50 is turned OFF. The dissipation of energy in the resistor 82 is determined by the energy stored in the magnetizing and leakage inductance of the output transformer 47 when the MOSFET is OFF. For a constant output voltage, this energy is essentially constant, regardless of the input voltage. Hence the clamping circuit of FIG. 6b produces a substantially constant incremental clamping voltage across the power MOSFET 50 at all input voltage levels, and essentially satisfies the waveforms shown in FIGS. 5a and 5c.

A further significant feature of the clamping circuit of FIG. 6b is that the voltage across it need not necessarily stay constant at all input voltage levels, but will automatically increase if necessary to satisfy equality of "positive" and "negative" voltage-time integrals across the transformer. This is explained by reference to the waveform in FIGS. 7a to 7e. Note that FIG. 7a is the same as FIG. 5c. The voltage waveform of FIG. 7a is the voltage across the switching device at the highest input voltage. Hence the peak value of this voltage waveform is the maximum voltage that the transistor 50 must withstand.

The basic criterion of equal areas above and below the d-c voltage level could also be satisfied by the waveform shown in FIG. 7b, in which the peak voltage is less than in FIG. 7a. The waveform shown in FIG. 7b could be obtained simply by lowering the value of resistor 82 of FIG. 6b. The magnetizing current in the transformer would then be as shown in FIG. 7c.

Consider now what would happen in the circuit of FIG. 6b when the d-c input voltage to the circuit is low. Assuming that the conduction duty cycle with low input voltage is about 1 in 2, as illustrated in FIG. 7d, the "incremental clamping voltage" (i.e., the voltage across the clamp circuit itself) must now be higher than that shown in FIG. 7b, in order for the condition of equality of "positive" and "negative" voltage-time integrals across the transformer 47 to be satisfied. The clamping circuit shown in FIG. 6b will automatically produce this required condition. The magnetizing current in the transformer naturally adjusts itself, as shown in FIG. 7e, to the extent that the energy stored in the transformer 47 just produces the extra voltage on the capacitor 81 needed to satisfy equality of "positive" and "negative" voltage-time integrals.

The additional magnetizing current in the transformer 47 obtained at lower d-c source voltages in FIG. 6b will increase losses in the circuit, and, to some extent, reduce the overall efficiency. This, however, is a worthwhile trade-off for reducing the maximum voltage to which the switching device 50 is subjected, and the increase in the reliability of the circuit.

A detailed circuit diagram of a preferred embodiment of the invention is shown in FIG. 8. The circuit of FIG. 8 employs the novel clamping circuit of FIG. 6b and components similar to those of FIG. 6b are given similar identifying numerals.

As shown in FIG. 8, a sensing transformer 101 is provided to monitor current flow in primary winding 46 of transformer 47. Thus, primary winding 102 is connected in series with winding 46. Secondary winding 103 has an output connected to resistors 103 and 104. Resistor 104 has an adjustable tap connected to pin 7 of integrated circuit 105. The other end of resistor 104 is connected to pins 1, 15 and 16, and is connected through capacitor 106, resistor 107, capacitor 108 and series capacitor 109 and resistor 110 to pins 10, 9, 4 and 3 respectively of integrated circuit 105.

A zener diode 120 is connected across the source-to-drain circuit of transistor 50 and zener diodes 121 and 122 are in its gate circuit. The gate of transistor 50 is further connected through resistor 123 to primary winding 124 of transformer 125. The secondary winding 126 of transformer 125 is connected, through capacitor 127, to pin 13 of integrated circuit chip 105.

The integrated circuit 105 shown in FIG. 8 serves the function of control circuit 51 of the foregoing figures.

The circuit of FIG. 8 has been built and tested, using the following devices and device values:

| | |
|---|---|
| Transistor 50 | IRF820 HEXFET |
| Integrated Circuit 105 | Silicon General 3526 |
| Bridge 45 | IR 3KCB80 |
| Capacitor 22 | 470 μF 450V wkg. |
| Capacitor 81 | 0.68 μF 200V |
| Capacitor 63 | 4X 150 μF 6V |
| Capacitor 108 | 22 μF 25V |
| Capacitor 127 | 0.5 μF 25V wkg. |
| Capacitor 109 | 10 μF |
| Capacitor 106 | 942pF |
| Resistor 82 | 600Ω 15W |
| Resistor 123 | 12Ω ¼W |
| Resistor 107 | 6.8kΩ ¼W |
| Resistor 103 | 10Ω |
| Resistor 110 | 12kΩ ¼W |
| Potentiometer 104 | 100Ω |
| Diode 60 | 20FQ030 |
| Diode 61 | 60HQ100 |
| Diode 80 | IR 40SL6 |
| Zener Diode 121 | 15V zener diode |
| Zener Diode 122 | 15V zener diode |
| Zener Diode 120 | 5X 100V zener diodes |
| Inductor 62 | 13 H 20A |
| Transformer 47 | Core TDX 26/20<br>Primary: 20 turns<br>3 in parallel, #32<br>Secondary: 3 turns<br>0.3mm X 0.8cm copper strip |
| Transformer 125 | 768T188/3 E2A (Ferroxcube)<br>Primary: 6 turns #24<br>Secondary: 6 turns #24 |
| Transformer 101 | 1041T060/3 E24 (Ferroxcube)<br>Primary: 1 turn<br>Secondary: 100 turns, #32 |

The operation produced by the circuit of FIG. 1 is shown in FIG. 9.

From the foregoing, it is seen that the novel circuit of the invention permits use of a single, commercially available power MOSFET for a switching regulator having an exceptional regulation range, sufficient to permit operation for a nominal 115 volt source or nominal 220/240 volt source without requiring switching of the circuit input.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A switching regulator comprising, in combination: an input rectifier circuit means, an inverter circuit comprising transformer means and transistor switching means in series with said transformer means and connected to the output of said input rectifier circuit means; an output circuit magnetically coupled to said transformer means for producing a relatively high frequency output a-c voltage at the frequency of switching of said transistor switching means; output rectifier means connected to said output circuit for rectifying said output a-c voltage and for producing a relatively constant output d-c voltage; said transistor switching means having a control electrode control circuit means connected to said transistor switching means control electrode for varying the conduction time of said transistor switching means in a manner to maintain said output d-c voltage at a constant value regardless of variation of the voltage output of said input rectifier circuit means within a given, relatively wide range; and unidirectional clamping circuit means connected in parallel with said transformer means to clamp one polarity of the instantaneous voltage across said transformer means to a value which is lower than the instantaneous value of voltage of the opposite polarity across said transformer means, and producing an asymmetry in the voltage wave form appearing across said transformer means; said unidirectional clamping circuit means being conductive for at least a substantial portion of the time when said transistor switching means is not conductive, so that energy stored in said transformer means when said transistor switching means is conductive is dissipated by said clamping circuit means over said substantial portion of the time when said transistor switching means is not conductive, whereby the peak-to-peak voltage across said transistor switching means is reduced from that which would be produced in the absence of said clamping circuit means; said input rectifier circuit means being connected to an input a-c source which has a voltage within the range from 85 volts to about 265 volts, said transistor switching means consisting of a single power MOSFET; said single power MOSFET transistor having a voltage rating which is less than the peak-to-peak voltage of the maximum voltage within said range of said input a-c source.

2. The device of claim 1, wherein said clamping circuit means includes a zener diode.

3. The device of claim 1, wherein said clamping circuit means comprises a diode and a parallel-connected capacitor and resistor in series with said diode, said capacitor being large enough to maintain a substantially constant voltage across said capacitor during circuit operation and said resistor being of a value to dissipate the energy stored in said transformer when said transistor switching means is conductive.

4. The device of claim 3, wherein values of said capacitor and said resistor are chosen so that a maximum voltage across said clamping circuit means automatically increases as necessary so that the energy stored in said transformer means when said switching transistor means is conductive is dissipated when said switching transistor means is not conductive.

* * * * *